UNITED STATES PATENT OFFICE.

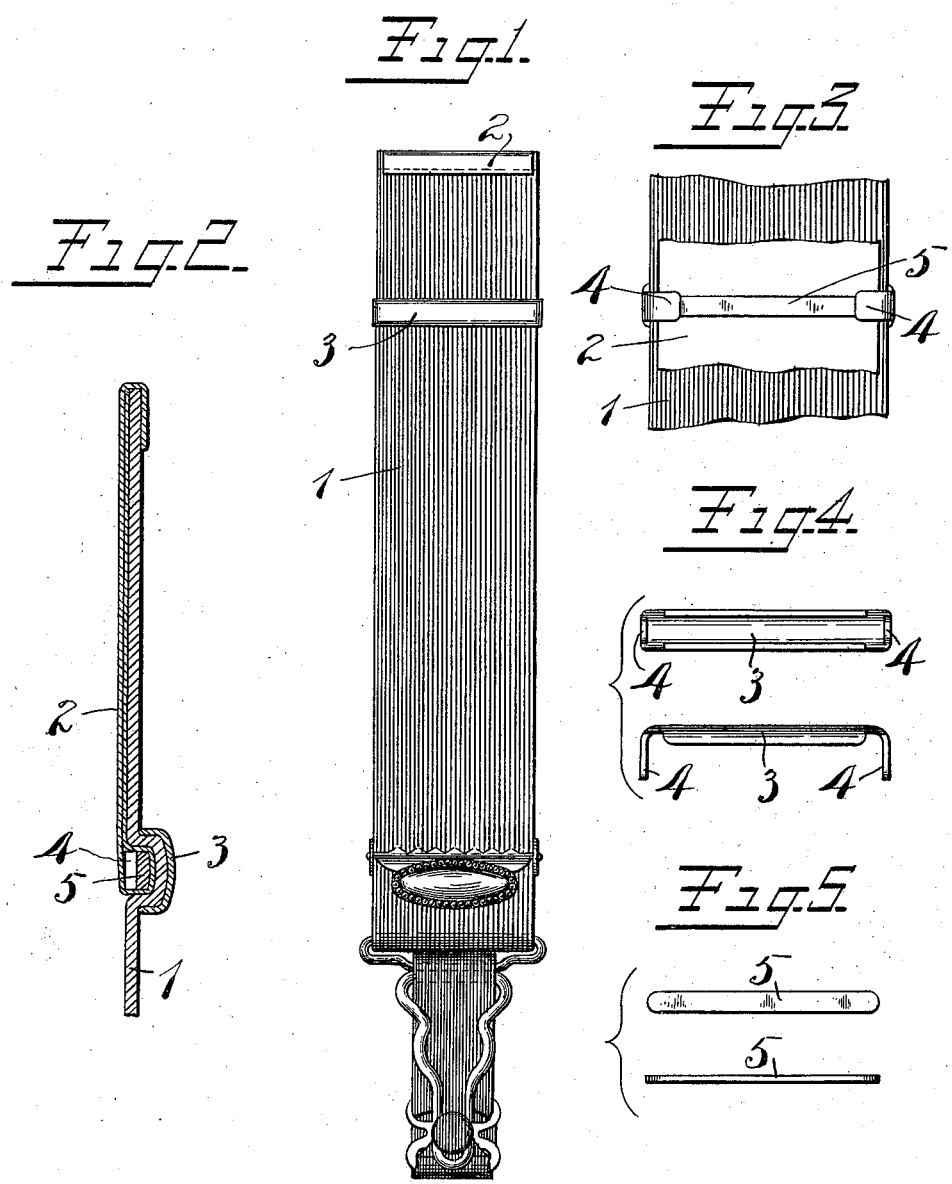

CHARLES J. WHITE, OF NEW BRITAIN, CONNECTICUT, ASSIGNOR TO C. J. WHITE MANUFACTURING COMPANY, OF NEW BRITAIN, CONNECTICUT, A CORPORATION OF CONNECTICUT.

HOSE-SUPPORTER STRIP.

1,023,101. Specification of Letters Patent. Patented Apr. 9, 1912.

Application filed April 1, 1911. Serial No. 618,275.

*To all whom it may concern:*

Be it known that I, CHARLES J. WHITE, a citizen of the United States, residing at New Britain, county of Hartford, State of Connecticut, have invented certain new and useful Improvements in Hose-Supporter Strips, of which the following is a full, clear, and exact description.

My invention relates to means for strengthening and reinforcing elastic webbing.

The object of the invention is to strengthen and reinforce the ends of a piece of elastic webbing so that it may be stitched or sewed to a garment or other support without injury to the effective part of the rubber threads.

In the accompanying drawings I have shown my invention as applied to a strip of webbing designed for use as a hose supporter, and have therein illustrated a preferred form thereof.

In said drawings Figure 1 is a front elevation of a hose supporter strip constructed to embody my invention. Fig. 2 is a relatively enlarged longitudinal section of one end of the strip. Fig. 3 is a view of part of the strip near one end and showing the reverse side of parts as they appear in process of construction. Fig. 4 illustrates by a rear and an edge elevation, part of a clamp of preferred construction. Fig. 5 is a similar illustration of the other part of said clamp.

1 represents a strip of elastic webbing. In Fig. 1, I have shown my improved reinforcement as applied to the upper end only of said strip 1. The reinforcement comprises a short length of relatively non-elastic webbing 2 secured permanently and non-adjustably to the elastic strip 1, in such a manner as to not injure the rubber threads which constitute the core thereof. For this purpose I employ a new and improved clamp which will accomplish the aforesaid results and which is preferably constructed as follows: Referring to Figs. 4 and 5, it will be seen that the clamp comprises the main body 3, channeled at its rear side. At the ends of the main body 3 are upturned ears 4—4. These ears are arranged to be pressed down in line with the channel of the main body 3 and to tightly hold the webbing therein by producing in the webbing, as shown in the sectional view (Fig. 2), abrupt bends, which bends exert such a frictional tendency that when the clamp is applied to the main webbing 1, it cannot shift thereon. In the preferred form, I employ a wedge block or presser bar 5 (Fig. 5), which is of such length and breadth as to settle into the channel of the clamp 3, as shown in Fig. 2, due allowance being made for the thickness of the webbing forced therein. The non-elastic webbing 2 being passed under the bar 5 (as shown in Fig. 2), is, when the ears 4—4 are pressed tightly down, held with the desired degree of firmness to form a permanent connection. The free end or ends of the non-elastic 2 are then passed upwardly toward or to the extreme end of the elastic webbing 1 and are there secured by stitches. In the drawings I have shown both ends of the elastic webbing extending upward to the end of the webbing (see Fig. 2), one end being wrapped around the extreme end of the elastic webbing to act as a binder. This is the preferred form.

By the improvement herein shown and described, an exceedingly positive grip is effected between the non-elastic and the elastic, tending to bind the same together permanently and non-adjustably. The metallic clamp extends across the webbing from edge to edge and all sharp edges or prongs may be omitted which, if present, might, in some cases, abrade the fabric or injure the rubber threads. The end of the strip, as thus finished, is rendered relatively non-elastic for only a very short distance with the result that the degree of elasticity of the strip as a whole is not materially affected. When such a strip is sewed into a garment, the stitches will cross the strip at the end beyond the clamp 3, and will pass through the non-elastic reinforcement whereby the strain will be taken entirely, or in great part, by said non-elastic; consequently the danger of breaking the rubber threads along said line will be avoided, since at that point said rubber threads are not under dangerous tension. As is well known, when stitches are used to attach an ordinary strip of elastic webbing to a garment, the needle employed frequently pierces the rubber threads, and in the absence of some effective means of the sort herein described, that injury is so great that in a very short time the webbing gives way along said line. By overcoming this weakness in the manner herein described, the life of the strip is greatly increased and a very substantial benefit results. As stated at the outset, both ends of a strip may be thus constructed if desired, it depending upon the particular use to which it is to be put; therefore, in its broadest sense, the invention should not be understood as being limited to a strip provided with said reinforcement at one end only.

In the preferred form of end reinforcement shown in the drawings, a distinct advantage is gained by threading the non-elastic strip as shown therein, wherein a portion of said strip will, when in place, overlie and protect that part of the clamp which might otherwise engage the body of the wearer. This not only protects the wearer, but secures the much to be desired so-called "rustless" effect. Again, in the preferred form of my improvement, the elastic webbing runs practically to the extreme end of the strip, that is to say, to a point beyond the clamp, so that the attaching threads, by which a strip is secured to a garment, will pass through both the elastic and non-elastic webbing, although it is obvious that this is not absolutely essential, since the real strain is taken at this point by the non-elastic webbing.

What I claim is:

1. As a new article of manufacture, two strips of webbing to be joined together flatwise, a metallic clamp for joining said strips together, said clamp comprising a channeled portion receiving both of said strips, and two end ears arranged to press said strips down into said channeled portion to hold the same therein.

2. As a new article of manufacture, two strips of webbing to be joined together flatwise, a metallic clamp for joining said strips together, said clamp comprising a channeled portion receiving both of said strips, two end ears arranged to press said strips down into said channeled portion to hold the same therein, and an intermediate presser bar between said ears and that part of the webbing in the channel.

3. As a new article of manufacture, a hose supporter comprising a main strip of elastic webbing, a non-elastic reinforcing strip therefor arranged to be joined to the main strip near one end thereof, a metallic clamp for securing said strips together, said clamp comprising a channeled portion, two end ears arranged to press both strips of said webbing down into said channeled portion, the lower part of the second strip being folded back to cover the back of said metallic clamp, including said ears, and means for securing said folded-back portion of the second strip to the end of the first mentioned strip.

CHARLES J. WHITE.

Witnesses:
 THOMAS MULLIGAN,
 ABBIE G. SANDBERG.

Copies of this patent may be obtained for five cents each, by addressing the "Commissioner of Patents, Washington, D. C."